US009499155B2

(12) United States Patent
Minegishi et al.

(10) Patent No.: US 9,499,155 B2
(45) Date of Patent: Nov. 22, 2016

(54) HYBRID VEHICLE

(71) Applicant: TOYOTA JIDOSHA KABUSHIKI KAISHA, Toyota-shi, Aichi-ken (JP)

(72) Inventors: Shinichiro Minegishi, Toyota (JP); Masaya Amano, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/955,350

(22) Filed: Dec. 1, 2015

(65) Prior Publication Data

US 2016/0152128 A1 Jun. 2, 2016

(30) Foreign Application Priority Data

Dec. 2, 2014 (JP) ................. 2014-243890

(51) Int. Cl.
| | | |
|---|---|---|
| B60W 20/00 | (2016.01) | |
| B60W 10/08 | (2006.01) | |
| B60W 10/06 | (2006.01) | |
| B60K 6/445 | (2007.10) | |
| B60W 50/029 | (2012.01) | |
| B60L 3/00 | (2006.01) | |
| B60L 11/12 | (2006.01) | |
| B60L 11/14 | (2006.01) | |
| B60L 11/18 | (2006.01) | |
| B60L 15/00 | (2006.01) | |
| B60K 6/28 | (2007.10) | |
| B60W 50/02 | (2012.01) | |

(52) U.S. Cl.
CPC ............... *B60W 10/08* (2013.01); *B60K 6/28* (2013.01); *B60K 6/445* (2013.01); *B60L 3/003* (2013.01); *B60L 11/123* (2013.01); *B60L 11/14* (2013.01); *B60L 11/1861* (2013.01); *B60L 11/1864* (2013.01); *B60L 15/007* (2013.01); *B60W 10/06* (2013.01); *B60W 20/40* (2013.01); *B60W 20/50* (2013.01); *B60W 50/029* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/547* (2013.01); *B60L 2240/549* (2013.01); *B60L 2250/24* (2013.01); *B60L 2250/26* (2013.01); *B60L 2260/28* (2013.01); *B60W 2050/0215* (2013.01); *B60W 2050/0295* (2013.01); *B60W 2710/0644* (2013.01); *Y10S 903/93* (2013.01)

(58) Field of Classification Search
CPC ...... B60W 10/08; B60K 6/445; B60L 3/008; B60L 11/123; B60L 11/14; B60L 11/1861
See application file for complete search history.

(56) References Cited

U.S. PATENT DOCUMENTS 7,164,253 B2 * 1/2007 Sato .................... B60L 11/1803
                                                             318/105

FOREIGN PATENT DOCUMENTS

| JP | 2010-12827 | 1/2010 |
|---|---|---|
| JP | 2014-184880 | 10/2014 |

*Primary Examiner* — John Walters
*Assistant Examiner* — James Triggs
(74) *Attorney, Agent, or Firm* — Finnegan, Henderson, Farabow, Garrett & Dunner, LLP

(57) ABSTRACT

In the state where a sensor used for controlling a first inverter has an abnormality, when rotation speed Ne of an engine is lower than a predetermined reference value Nref (S120), three phase-on control of a first inverter is performed (S190). This causes the rotation speed of the engine to be increased with an increase in rotation speed of a driveshaft. Operation control of the engine is started when the rotation speed Ne of the engine reaches or exceeds a threshold value Nst (S210 to S230).

4 Claims, 5 Drawing Sheets

HYBRID VEHICLE

TECHNICAL FIELD

The present invention relates to a hybrid vehicle and more specifically a hybrid vehicle equipped with an engine, a planetary gear, first and second motors, first and second inverters, and a battery.

BACKGROUND ART

A proposed configuration of a hybrid vehicle includes an engine, a planetary gear, first, and second motors, first and second inverters, a battery and a booster circuit (for example, JP 2010-12827A). A rotor of the first motor is connected with a sun gear of the planetary gear. A crankshaft of the engine is connected, with a carrier of the planetary gear. A driveshaft linked with drive wheels is connected with a ring gear of the planetary gear. A rotor of the second motor is connected with the driveshaft. The first and the second inverters serve to respectively drive the first motor and the second motor. The booster circuit serves to boost up the electric power in a low voltage system connected with the battery and supply the boosted-up electric power to a high voltage system connected with the first and second inverters, while serving to step down the electric power in the high voltage system and supply the stepped-down electric power to the low voltage system. In the event of a specified abnormality that interferes with normally driving the first motor in a range that allows gates of the first inverter to be shut off, the hybrid vehicle of this configuration shuts off the gates of the first inverter and controls the engine, the booster circuit and the second inverter as described below the hybrid vehicle allows for self-sustaining operation of the engine at a maximum rotation speed. The hybrid vehicle sets a target voltage of the high voltage system to cause the first motor that generates a back electromotive force accompanied with rotation to generate a maximum possible generated power, and controls the booster circuit to make the voltage of the high voltage system equal to the target voltage. The hybrid vehicle controls the second inerter to be driven with a required torque output from the second motor to the driveshaft within a range of input limit and output limit of the battery. This increases the time duration when the hybrid vehicle is drivable with only the power from the second motor.

CITATION LIST

Patent Literature

PTL 1: JP 2010-12827 A

SUMMARY OF INVENTION

Technical Problem

In the event of a specified abnormality during stop of operation of the engine, the hybrid vehicle of the above configuration continues stop of operation of the engine and is driven with only the power from the second motor. This decreases the drivable time and the drivable distance of a run with only the power from the second motor. There is accordingly a need to start operation of the engine in the case where the first motor fails to crank the engine.

With regard to the hybrid vehicle, an object of the invention is to start operation of an engine when a sensor used for controlling a first inverter has an abnormality during stop of operation of the engine.

Solution to Problem

In order to solve at least part of the problems described above, the hybrid vehicle of the invention may be implemented by the following aspects or configurations.

The present invention is directed to a hybrid vehicle. The hybrid vehicle includes an engine, a first motor that is configured as a three-phase AC motor to input and output power, a planetary gear that is configured to have three rotational elements connected with a rotating shaft of the first motor, an output shaft of the engine and a driveshaft linked with drive wheels such that the rotating shaft, the output shaft and the driveshaft are arrayed in this sequence in a collinear diagram, a second motor that is configured to input and output power from and to the driveshaft, a first inverter that is configured to drive the first motor, a second inverter that is configured to drive the second motor, a battery that is configured to transmit electric power to and from the first motor and the second motor via the first inverter and the second inverter, and a controller that is configured, in a specified abnormality state that a sensor used for controlling the first inverter has an abnormality during stop of operation of the engine, to perform three phase-on control of the first inverter to turn on either all switching elements in an upper arm or all switching elements in a lower arm among a plurality of switching elements of the first inverter, to control the second inverter such that a driving torque is output from the second motor to the driveshaft, and to start operation control of the engine when rotation speed of the engine becomes equal to or higher than a predetermined rotation speed.

In the hybrid vehicle of this aspect, the rotating shaft of the first motor, the output shaft of the engine and the driveshaft linked with the drive wheels are connected with the three rotational elements of the planetary gear such as to be arrayed in the sequence of the rotating shaft, the output shaft, and the driveshaft in the collinear diagram. In the specified, abnormality state that the sensor used for controlling the first inverter has an abnormality during stop of operation of the engine, the hybrid vehicle controls the engine, the first inverter and the second inverter as described below. The hybrid vehicle performs the three phase-on control of the first inverter to turn on either all the switching elements in the upper arm or all the switching elements in the lower arm among the plurality of switching elements of the first inverter. The hybrid vehicle controls the second inverter such that the driving torque is output from the second motor to the driveshaft. The hybrid vehicle starts operation control of the engine when the rotation speed of the engine becomes equal to or higher than the predetermined rotation speed. According to the relationship in the collinear diagram, during stop of operation of the engine, positive rotation speed of the driveshaft provides negative rotation speed of the first motor. When the first motor has negative rotation speed, the three phase-on control of the first inverter produces a torque (drag torque) in a direction of providing positive rotation speed of the first motor. When the rotation speed of the driveshaft is increased by the torque output from the second motor to the driveshaft, the drag torque of the first motor works to suppress the rotation speed of the first motor from decreasing (increasing as negative value). This accordingly increases the rotation speed of the engine. In the case where the first motor fails to crank the engine, this increases the rotation speed of the engine to a level for starting operation control of the engine. When the rotation speed of the engine becomes equal to or higher than the predetermined rotation speed, the hybrid vehicle starts operation control of the engine and enables the rotation speed of the engine to be further increased by the torque output from the engine. After the rotation speed of the engine is increased to a certain level, the hybrid vehicle shuts off the gates of the first inverter and causes the engine to be rotated with a target rotation speed. This enables an electric power caused by a back electromotive force of the first motor to be used to charge the battery and drive the second motor. This further increases the drivable time and the drivable distance during a run with only the power from the second motor.

DESCRIPTION OF EMBODIMENTS

The following describes some aspects of the invention with reference to embodiments.

Figure 1:
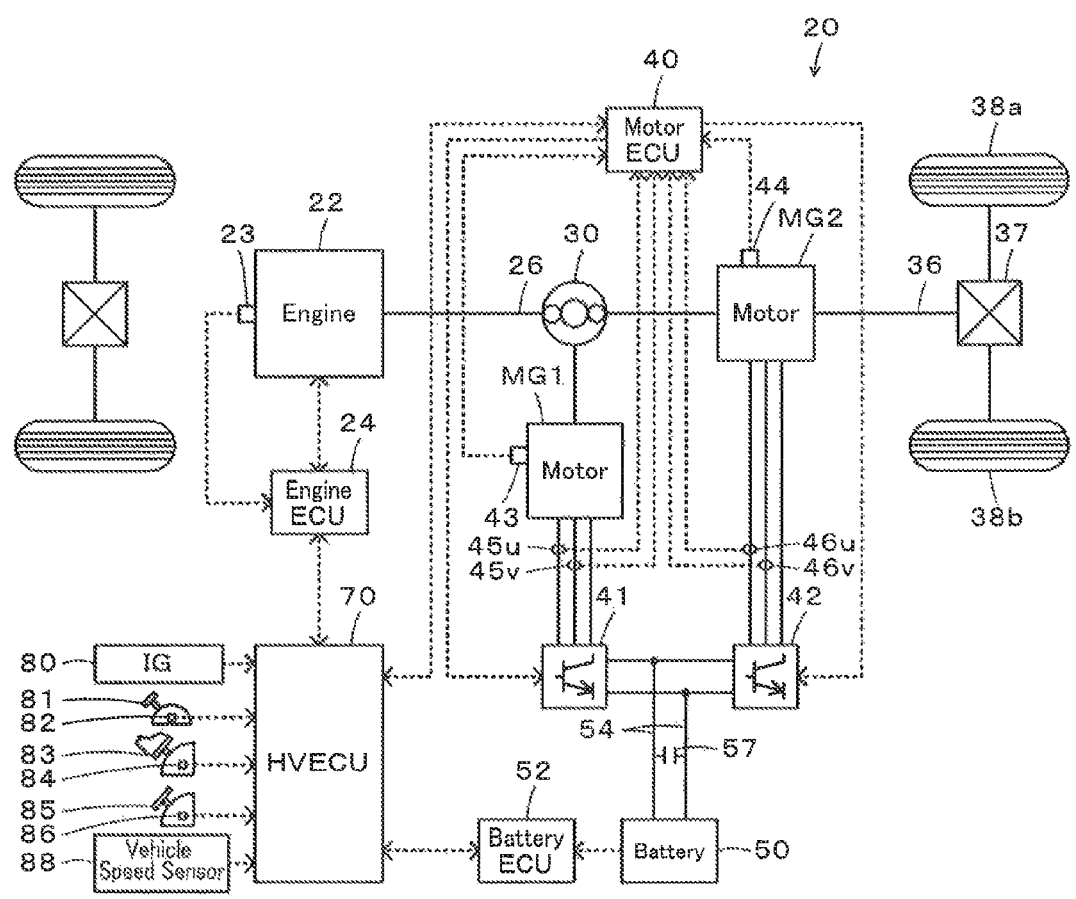
FIG. 1 is a configuration diagram illustrating the schematic configuration of a hybrid vehicle according to one embodiment of the invention.
Figure 2:
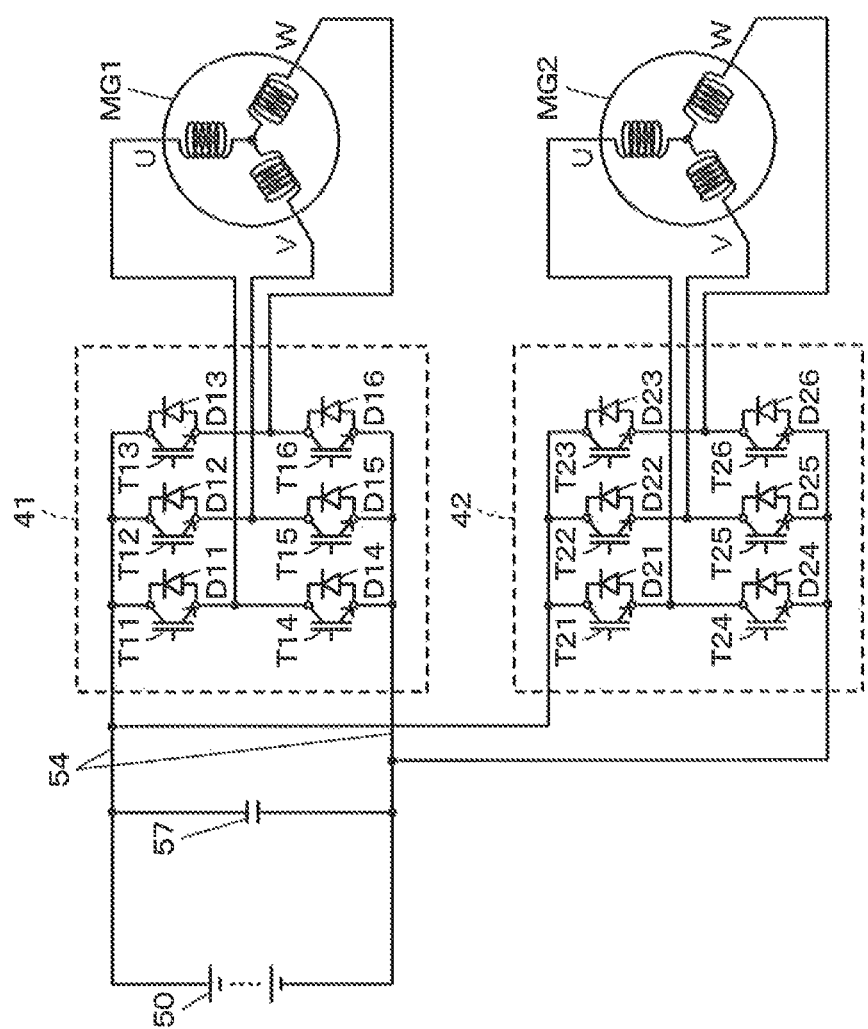
FIG. 2 is a configuration diagram illustrating the schematic configuration of an electric drive system including motors MG1 and MG2.

FIG. 1 is a configuration diagram illustrating the schematic configuration of a hybrid vehicle 20 according to one embodiment of the invention. FIG. 2 is a configuration diagram illustrating the schematic configuration of an electric drive system including motors MG1 and MG2.

As shown in FIG. 1, the hybrid vehicle 20 of the embodiment, includes an engine 22, a planetary gear 30, motors MG1 and MG2, inverters 41 and 42, a battery 50 and a hybrid electronic control unit (hereinafter referred to as HVECU) 70.

The engine 22 is configured as an internal combustion engine that output power using, for example, gasoline or light oil as fuel. This engine 22 is operated and controlled by an engine electronic control unit (hereinafter referred to as engine ECU) 24.

The engine ECU 24 is implemented by a CPU-based microprocessor and includes a ROM that stores processing programs, a RAM that temporarily stores data, input and output ports and a communication port other than the CPU, although not being illustrated. The engine ECU 24 inputs, via its input port, signals from various sensors required for operation control of the engine 22, for example, a crank position θcr from a crank position sensor 23 configured to detect the rotational position of a crankshaft 26. The engine ECU 24 outputs, via its output port, various control signals for operation control of the engine 22, for example, a drive signal to a throttle motor configured to adjust the position of a throttle valve, a drive signal to a fuel injection valve and a control signal to an ignition coil integrated with an igniter. The engine ECU 24 is connected with the HVECU 70 via their communication ports to perform operation control of the engine 22 in response to control signals from the HVECU 70 and output data regarding the operating conditions of the engine 22 to the HVECU 70 as appropriate. The engine ECU 24 computes the rotation speed of the crankshaft 26, which is equal to a rotation speed Ne of the engine 22, based on the crank position θcr detected by the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 linked with drive wheels 38a and 38b via a differential gear 37. The planetary gear 30 also includes a carrier that, is connected with the crankshaft 26 of the engine 22.

The motor MG1 is configured as a synchronous motor generator including a rotor with permanent magnets embedded therein and a stator with three-phase coils wound thereon. The rotor of the motor MG1 is connected with the sun gear of the planetary gear 30 as described above. The motor MG2 is also configured as a synchronous motor generator like the motor MG1 and has a rotor connected with the driveshaft 36.

The inverters 41 and 42, and the battery 50 are connected by a power line 54. A smoothing capacitor 57 is mounted to the power line 54.

As shown in FIG. 2, the inverter 41 includes six transistors T11 to T16 and six diodes D11 to D16 that are connected reversely in parallel to the transistors T11 to T16. The transistors T11 to T16 are arranged in pairs as the source and the sink relative to a positive bus bar and a negative bus bar of the power lines 54. The three-phase coils (U phase, V phase and W phase) of the motor MG1 are respectively connected with respective junction points of the three paired transistors in the transistors T11 to T16. The ratio of the on time of the respective paired transistors in the transistors T11 to T16 is regulated by a motor electronic control unit (hereinafter referred to as motor ECU) under application of a voltage to the inverter 41. This forms a rotating magnetic field in the three-phase coils to rotate to drive and rotate the motor MG1.

Like the inverter 41, the inverter 42 has six transistors T21 to T26 and six diodes D21 to D26. The ratio of the on time of the respective paired transistors in the transistors T21 to T26 is regulated by the motor ECU 40 under application of a voltage to the inverter 42. This forms a rotating magnetic field in the three-phase coils to rotate to drive and rotate the motor MG2.

The motor ECU 40 is implemented by a CPU-based microprocessor and includes a ROM that stores processing programs, a RAM that temporarily stores data, input and output ports and a communication port, other than the CPU, although not being illustrated. As shown in FIG. 1, the motor ECU 40 inputs, via its input port, signals from various sensors required for drive control of the motors MG1 and MG2, for example, rotational positions θm1 and θm2 of the rotors of the motors MG1 and MG2 from rotational position detection sensors 43 and 44 such as resolvers and phase currents Iu1, Iv1, Iu2 and Iv2 of the respective phases of the motors MG1 and MG2 from current sensors 45u, 45v, 46u and 46v. The motor ECU 40 outputs, via its output port, for example, switching control signals to the transistors T11 to T16 of the inverter 41 and the transistors T21 to T26 of the inverter 42. The motor ECU 40 is connected with the HVECU 70 via their communication ports to perform drive control of the motors MG1 and MG2 in response to control signals from the HVECU 70 and output data regarding the driving conditions of the motors MG1 and MG2 to the HVECU 70 as appropriate. The motor ECU 40 computes rotation speeds Nm1 and Nm2 of the motors MG1 and MG2 based on the rotational positions θm1 and θm2 of the rotors of the motors MG1 and MG2 detected by the rotational position detection sensors 43 and 44.

The battery 50 is configured, for example, as a lithium ion secondary battery or a nickel hydride secondary battery. The battery 50 is managed by a battery electronic control unit (hereinafter referred to as battery ECU) 52.

The battery ECU 52 is implemented by a CPU-based microprocessor and includes a ROM that stores processing programs, a RAM that temporarily stores data, input and output, ports and a communication port other than the CPU, although not being illustrated. The battery ECU 52 inputs, via its input port, signals required for management of the battery 50, for example, a battery voltage Vb from a voltage sensor located between terminals of the battery 50, a battery current Ib from a current sensor mounted to an output terminal of the battery 50, and a battery temperature Tb from a temperature sensor mounted to the battery 50. The battery ECU 52 is connected with the HVECU 70 via their communication ports to output data regarding the conditions of the battery 50 to the HVECU 70 as appropriate. With a view to managing the battery 50, the battery ECU 52 computes a state of charge SOC which denotes a ratio of the capacity of electric power dischargeable from the battery 50 to the entire capacity, based on an integrated value of the battery current Ib detected by the current sensor.

The HVECU 70 is implemented by a CPU-based microprocessor and includes a ROM that stores processing programs, a RAM that, temporarily stores data, input, and output ports and a communication port other than the CPU, although not being illustrated. The HVECU 70 inputs, via its input port, for example, an ignition signal from an ignition switch 80, a shift position SP from a shift position sensor 82 configured to detect the operational position of a shift lever 81, an accelerator position Acc from an accelerator pedal position sensor 84 configured to detect the depression amount, of an accelerator pedal 83, a brake pedal position BP from a brake pedal position sensor 86 configured to detect the depression amount of a brake pedal 85 and a vehicle speed V from a vehicle speed sensor 88. As described above, the HVECU 70 is connected with the engine ECU 24, the motor ECU 40 and the battery ECU 52 via their communication ports to transmit, various control signals and data to and from the engine ECU 24, the motor ECU 40 and the battery ECU 52.

The hybrid vehicle 20 of the embodiment having the above configuration runs in a hybrid drive mode (HV drive mode) driven with operation of the engine 22 and in an electric drive mode (EV drive mode) driven with stop of operation of the engine 22.

During a run in the HV drive mode, the HVECU 70 first sets a required torque Tr* for driving (to be output to the driveshaft 36), based on the accelerator position Acc from the accelerator pedal position sensor 84 and the vehicle speed V from the vehicle speed sensor 88. The HVECU 70 subsequently multiplies the set required torque Tr* by a rotation speed Nr of the driveshaft 36 to calculate a driving power Pdrv* required for driving. A rotation speed Nm2 of the motor MG2 is used as the rotation speed Nr of the driveshaft 36. The HVECU 70 subtracts a required charge-discharge power Pb* of the battery 50 (positive value in the case of discharging from the battery 50) from the calculated driving power Pdrv* to set a required power Pe* for the vehicle (to be output from the engine 22). The HVECU 70 then sets a target rotation speed Ne* and a target torque Te* of the engine 22 and torque commands Tm1* and Tm2* of the motors MG1 and MG2 such as to cause the required power Te* to be output from the engine 22 and cause the required torque Tr* to be output to the driveshaft 36. The HVECU 70 sends the target rotation speed Ne* and the target, torque Te* of the engine 22 to the engine ECU 24, while sending the torque commands Tm1* and Tm2* of the motors MG1 and MG2 to the motor ECU 40. When receiving the target rotation speed Ne* and the target torque Te* of the engine 22, the engine ECU 24 performs intake air flow control, fuel injection control and ignition control of the engine 22 such as to operate the engine 22 based on the target rotation speed Ne* and the target torque Te*. When receiving the torque commands Tm1* and Tm2* of the motors MG1 and MG2, the motor ECU 40 performs switching control of the transistors T11 to T16 of the inverter 41 and the transistors T21 to T26 of the inverter 42 to drive the motors MG1 and MG2 with the torque commands Tm1* and Tm2*. The inverters 41 and 42 are controlled by pulse width modulation control (PWM control) using the rotational positions θm1 and θm2 of the rotors of the motors MG1 and MG2 detected by the rotational position detection sensors 43 and 44 and the phase currents Iu1, Iv1, Iu2 and Iv2 of the respective phases of the motors MG1 and MG2 from the current sensors 45u, 45v, 46u and 46v. The PWM control compares voltage commands of the motors MG1 and MG2 with triangular wave (carrier wave) voltages to regulate the ratio of the on time of the transistors T11 to T16 and T21 to T26. Upon satisfaction of a stop condition of the engine 22 during a run in the HV drive mode, for example, when the required power Pe* becomes equal to or less than a stop threshold value Pstop, the hybrid vehicle 20 stops operation of the engine 22 and shifts the drive mode to the EV drive mode.

During a run in the EV drive mode, the HVECU 70 first sets the required torque Tr*, based on the accelerator position Acc from the accelerator pedal position sensor 84 and the vehicle speed V from the vehicle speed sensor 88. The HVECU 70 subsequently sets the torque command Tm1* of the motor MG1 to value 0 and sets the torque command Tm2* of the motor MG2 such as to cause the required torque Tr* to be output to the driveshaft 36. The HVECU 70 then sends the torque commands Tm1* and Tm2* of the motors MG1 and MG2 to the motor ECU 40. When receiving the torque commands Tra1* and Tra2* of the motors MG1 and MG2, the motor ECU 40 performs switching control of the transistors T11 to T16 of the inverter 41 and the transistors T21 to T26 of the inverter 42 to drive the motors MG1 and MG2 with the torque commands Tm1* and Tm2*. Upon satisfaction of a restart condition of the engine 22 during a run in the EV drive mode, for example, when the required power Pe* calculated in the same manner as that during a run in the HV drive mode becomes larger than the stop threshold value Pstop, the hybrid vehicle 20 restarts operation of the engine 22 and shifts the drive mode to the HV drive mode.

A basic procedure of starting the engine 22 cranks the engine 22 by outputting a cranking torque Tcr for cranking the engine 22 from the motor MG1 while outputting a cancellation torque Tcn for cancelling a torque applied to the driveshaft 36 accompanied with, output of this cranking torque Tcr from the motor MG2, and starts operation control (fuel injection control and ignition control) of the engine 22 when the rotation speed Ne of the engine 22 reaches or exceeds a predetermined rotation speed (for example, 800 rpm or 1000 rpm). During the start of the engine 22, drive control of the motor MG2 is performed to cause the required torque Tr* to be output to the driveshaft 36. In other words, the torque to be output from the motor MG2 is a total torque of the required torque Tr* and the cancellation torque Tcn.

Figure 3:
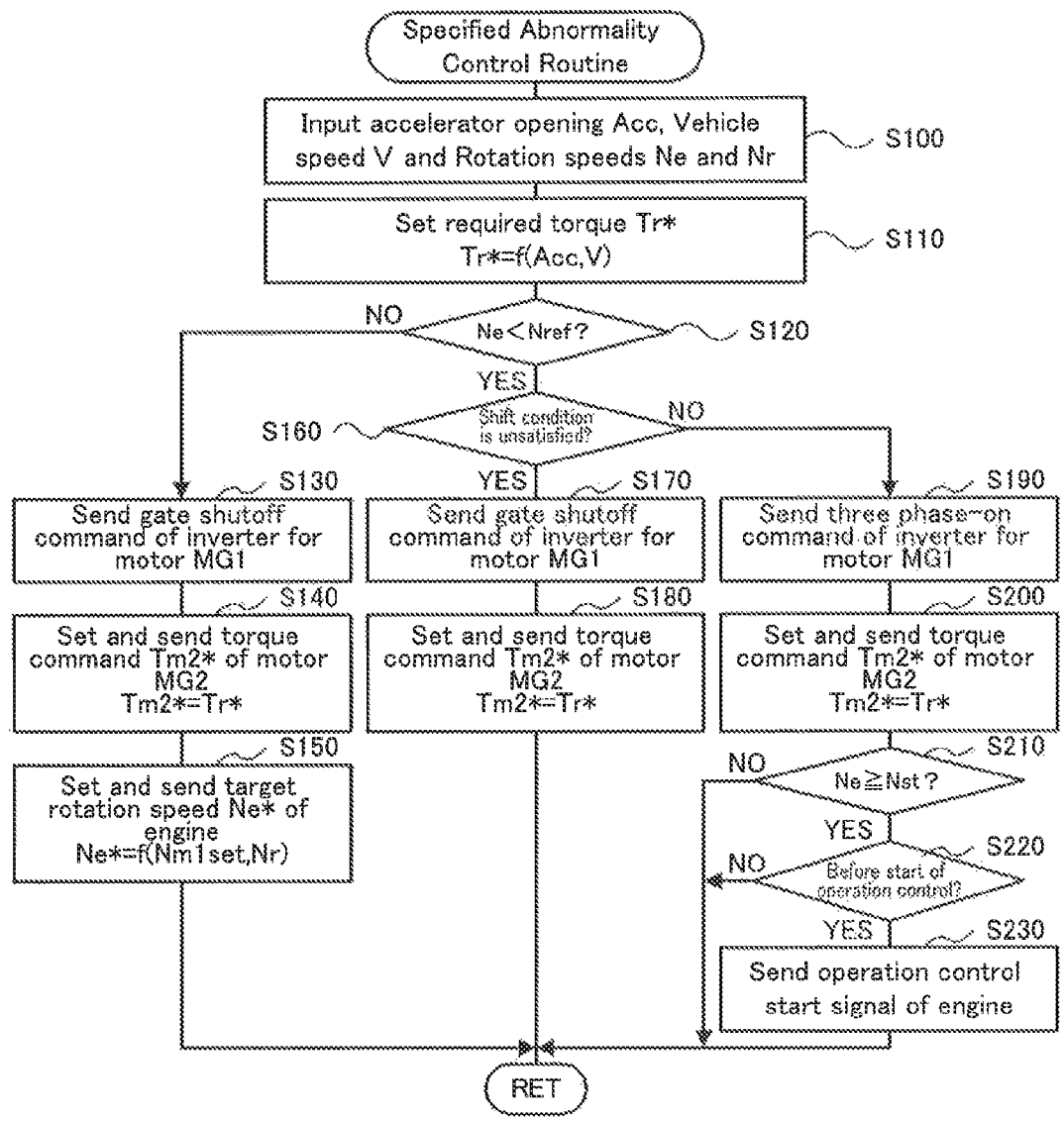
FIG. 3 is a flowchart showing one example of specified abnormality control routine performed by the HVECU 70 of the embodiment.

The following describes the operations of the hybrid vehicle 20 of the embodiment having the configuration described above or more specifically the operations in the event of a specified abnormality in a sensor used for control of the inverter 41 (for drive control of the motor MG1), such as the rotational position detection sensor 43 or the current sensors 45$u$ and 45$v$. FIG. 3 is a flowchart showing one example of specified abnormality control routine performed by the HVECU 70 of the embodiment. This routine is repeatedly performed at predetermined time intervals (for example, every several msec) in the event of a specified abnormality.

On start of the specified abnormality control routine, the HVECU 70 first inputs data such as the accelerator position Acc, the vehicle speed V, the rotation speed Ne of the engine 22 and the rotation speed Nr of the driveshaft 36 (step S100). The input accelerator position Acc is a value detected by the accelerator pedal position sensor 84. The input vehicle speed V is a value detected by the vehicle speed sensor 68. The input rotation speed Ne of the engine 22 is a calculated value from the crank position θcr detected by the crank position sensor 23. The input rotation speed Nr of the driveshaft 36 is the rotation speed Nm2 of the motor MG2. The rotation speed Nm2 of the motor MG2 is computed based on the rotational position θm2 of the rotor of the motor MG2 detected by the rotational position detection sensor 44 and is input from the motor ECU 40 by communication.

Figure 4:
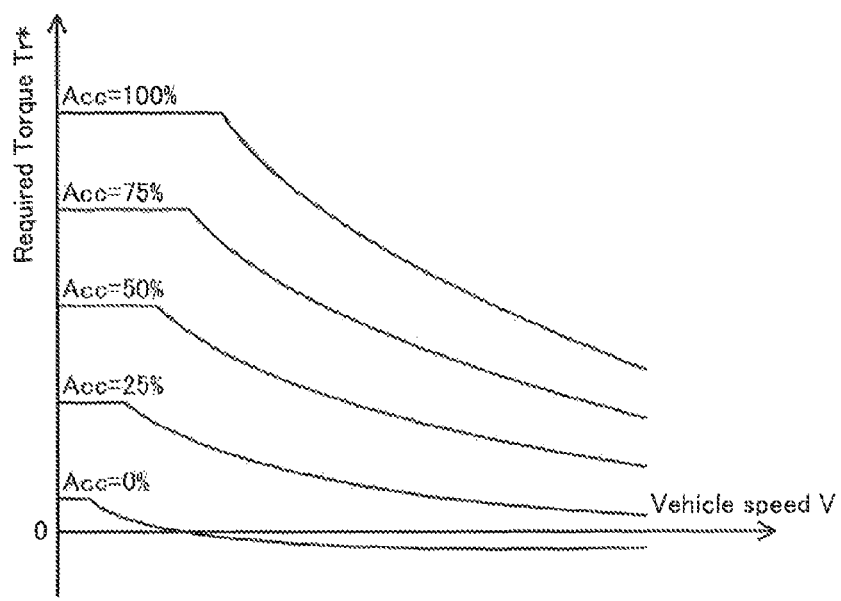
FIG. 4 is one example of a required torque setting map.

After the data input, the HVECU 70 sets a required torque Tr* for driving, based on the input accelerator position Acc and the input vehicle speed V (step S110). A procedure of setting the required, torque Tr* according to the embodiment stores predefined relationship between the vehicle speed V and the required torque Tr* at different accelerator positions Acc as a required torque setting map in the ROM (not shown), and reads and sets the required torque Tr* corresponding to the given accelerator position Acc and the given vehicle speed V from the stored map. One example of the required torque setting map is shown in FIG. 4.

After setting the required torque Tr*, the HVECU 70 compares the input rotation speed Ne of the engine 22 with a predetermined reference value Nref (step S120). The reference value Nref is used to determine whether the engine 22 is rotated at a certain level of rotation speed and may be, for example, 700 rpm or 800 rpm.

When the rotation speed Ne of the engine 22 is equal to or higher than the reference value Nref, the HVECU 70 sends a gate shutoff command of the inverter 41 to the motor ECU 40 (step S130). The HVECU 70 subsequently sets the required torque Tr* to a torque command Tm2* of the motor MG2 and sends the torque command Tm2* of the motor MG2 to the motor ECU 40 (step S140). When receiving the gate shutoff command of the inverter 41 and the torque command Tm2* of the motor MG2, the motor ECU 40 shuts off the gates of the inverter 41 (turns off all the transistors T11 to T16), while performing switching control of the transistors T21 to T26 of the inverter 42 such as to drive the motor MG2 with the torque command Tm2*.

The HVECU 70 subsequently sets a target rotation speed Ne* of the engine 22 according to Equation (1) given below using a predetermined rotation speed Nm1set of the motor MG1 and the rotation speed Nr of the driveshaft 36, such as to rotate the motor MG1 at the predetermined rotation speed Nm1set (step S150) and terminates this routine. When receiving the target rotation speed Ne* of the engine 22, the engine ECU 24 performs intake air flow control, fuel injection control and ignition control of the engine 22 such as to rotate the engine 22 at the target, rotation speed Ne*.

$$Ne*=Nm1set \cdot \rho/(1+\rho)+Nr/(1+\rho) \tag{1}$$

Figure 5:
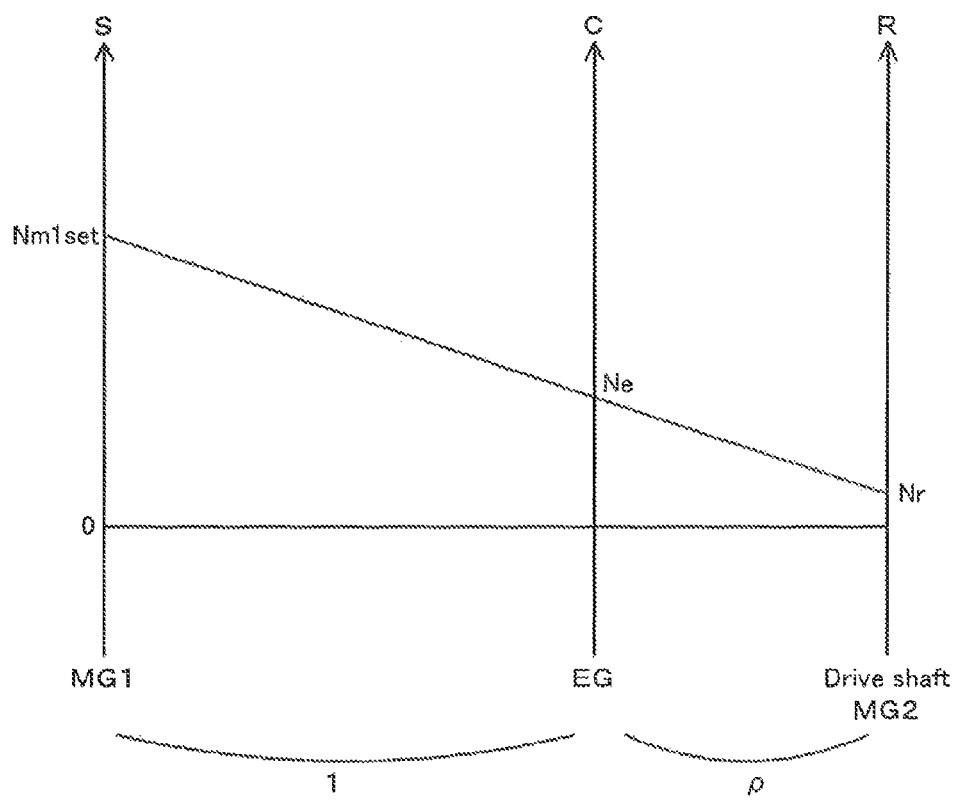
FIG. 5 is a collinear diagram illustrating one example of relationship of rotation speeds with regard to the rotational elements of a planetary gear.

FIG. 5 is a collinear diagram illustrating one example of relationship of rotation speeds with regard to the rotational elements of the planetary gear 30. In the diagram, S axis on the left indicates the rotation speed of the sun gear that is equivalent to the rotation speed Nm1 of the motor MG1, C axis in the middle indicates the rotation speed of the carrier that is equivalent to the rotation speed Ne of the engine 22, and R axis on the right indicates the rotation speed Nr of the ring gear (driveshaft 36) that is equivalent to the rotation speed Nm2 of the motor MG2. Equation (1) is readily introduced from this collinear diagram. In the state that the gates of the inverter 41 are shut off, when a back electromotive force generated by rotation of the motor MG1 is higher than the voltage of the power lines 54, an electric power caused by the back electromotive force (hereinafter referred to as back electromotive-generated power) is supplied to the power lines 54. According to this embodiment, by taking into account this phenomenon, for example, a rotation speed that maximizes the back electromotive-generated power of the motor MG1 or a rotation speed in a rotation speed range that provides the back electromotive-generated power of the motor MG1 equal to or higher than a threshold value may be determined in advance by experiment or by analysis and may be used as the predetermined rotation speed Nm1set of the motor MG1.

Such control enables the hybrid vehicle 20 to be driven by specified power generation drive that uses the back electromotive-generated power of the motor MG1 to drive the motor MG2 and charge the battery 50. This further increases the drivable time and the drivable distance for a run with only the torque (power) output from the motor MG2 to the driveshaft 36. The predetermined reference value Nref described above may thus be regarded as a reference value whether the hybrid vehicle 20 is to be driven by such specified power generation drive.

When it is determined at step S120 that the rotation speed Ne of the engine 22 is lower than the reference value Nref, the HVECU 70 determines whether a shift condition for a shift to the specified power generation drive is unsatisfied (step S160). According to this embodiment, the shift condition includes an accelerator position condition that the accelerator position Acc is equal to or higher than a reference value Aref and a vehicle speed condition that the vehicle speed V is between a reference value Vref1 and a reference value Vref2, inclusive. The reference value Aref may be, for example, 15%, 20% or 25%. The reference value Vref1 may be, for example, 1 km/h, 2 km/h or 3 km/h. The reference value Vref2 may be, for example, 14 km/h, 15 km/h or 16 km/h. According to this embodiment, when only one of or neither of the accelerator position condition and the vehicle speed condition is satisfied, it is determined that the shift condition is not satisfied. When both of the accelerator position condition and the vehicle speed condition are satisfied, on the other hand, it is determined that the shift condition is satisfied.

When it is determined at step S160 that the shift condition is unsatisfied, the HVECU 70 sends a gate shutoff command of the inverter 41 to the motor ECU 40 (step 3170). The HVECU 70 subsequently sets the required torque Tr* to the torque command Tm2* of the motor MG2 and sends the torque command Tra2* of the motor MG2 to the motor ECU 40 (step S180) and terminates this routine. When receiving the gate shutoff command of the inverter 41 and the torque command Tm2* of the motor MG2, the motor ECU 40 shuts off the gates of the inverter 41 (turns off all the transistors T11 to T16), while performing switching control of the transistors T21 to T26 of the inverter 42 such as to drive the motor MG2 with the torque command Tm2*.

When it is determined at step S160 that the shift condition is satisfied, on the ether hand, the HVECU 70 sends a three phase-on command of the inverter 41 to the motor ECU 40. The HVECU 70 subsequently sets the required torque Tr* to the torque command Tm2* of the motor MG2 and sends the torque command Tm2* of the motor MG2 to the motor ECU 40 (step S200). The motor ECU 40 performs the following control when receiving the three phase-on command and the torque command Tm2* of the motor MG2. The motor ECU 40 performs three phase-on control of the inverter 41. The three phase-on control turns on all the transistors in the upper arm (T11 to T13) while turning off all the transistors in the lower arm (T14 to T16) among the transistors T11 to T16, or alternatively turns off all the transistors in the upper arm (T11 to T13) while turning on all the transistors in the lower aria (T14 to T16). The motor ECU 40 also performs switching control of the transistors T21 to 126 of the inverter 42 such as to drive the motor MG2 with the torque command Tm2*.

Figure 6:
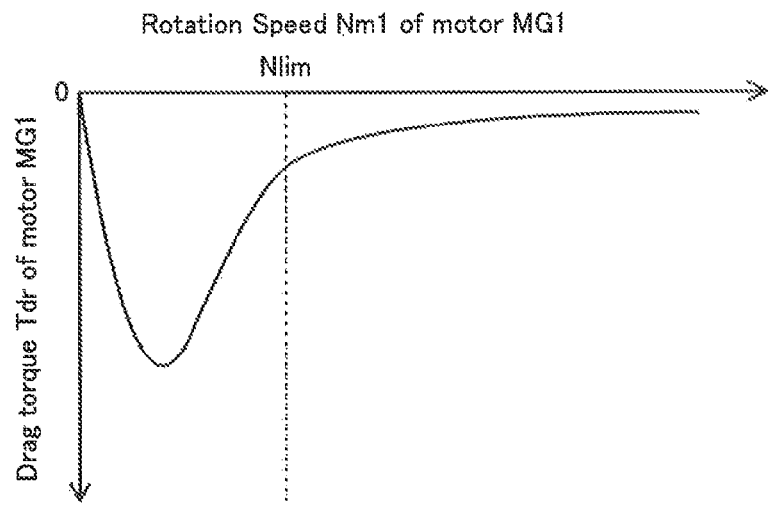
FIG. 6 is a diagram illustrating one example of relationship between rotation speed Nm1 of the motor MG1 and drag torque Tdr during three phase-on control of an inverter.

FIG. 6 is a diagram illustrating one example of relationship between rotation speed Nm1 of the motor MG1 and drag torque Tdr during three phase-on control of the inverter 41. As illustrated, in the motor MG1 configured as a three-phase AC synchronous motor generator, the drag torque Tdr in the three phase-on state of the inverter 41 is provided as negative torque (torque in a direction of making the rotation speed Nm1 approach to value 0), such that the absolute value of the drag torque Tdr first increases and then decreases with an increase in rotation speed Nm1 from value 0. FIG. 6 shows the case where the motor MG1 has positive rotation speed Nm1. The drag torque Tdr is provided as positive torque when the motor MG1 has negative rotation speed Nm1.

Figure 7:
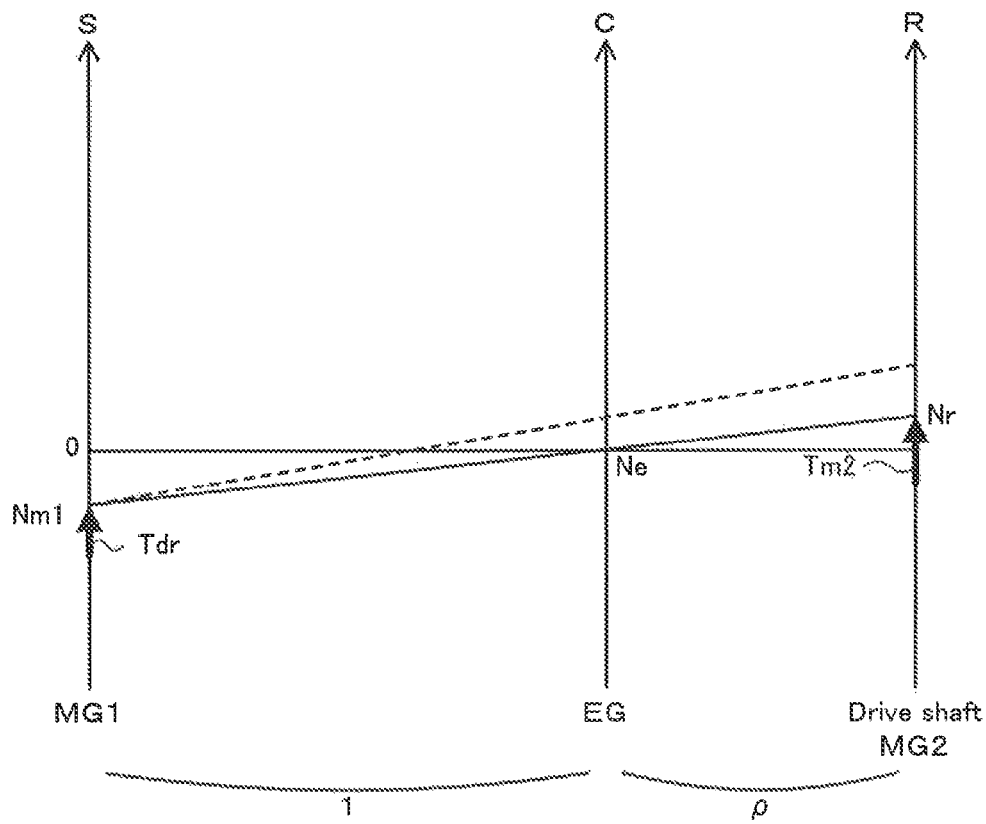
FIG. 7 is a collinear diagram illustrating one example of relationship between rotation speed and torque with regard to the rotational elements of the planetary gear during a run with the three phase-on control of the inverter.

FIG. 7 is a collinear diagram illustrating one example of relationship between rotation speed and torque with regard to the rotational elements of the planetary gear 30 during a run with the three phase-on control of the inverter 41. In the diagram of FIG. 7, a solid-line graph shows the state that the engine 22 stops rotation, and a broken-line graph shows the state that the rotation speed Nr of the driveshaft 36 (vehicle speed V) increases. As shown by the solid-line graph, when the driveshaft 36 has positive rotation speed Nr during stop of rotation of the engine 22, the motor MG1 has negative rotation speed Nm1. The three phase-on control of the inverter 41 in this state causes the drag torque Tdr of the motor MG1 to be provided as torque in a direction of increasing the rotation speed Nm1 of the motor MG1 as shown by a thick arrow on the S axis. The drag torque Tdr of the motor MG1 works to suppress the rotation speed Nm1 of the motor MG1 from decreasing (increasing as negative value) when the rotation speed Nr of the driveshaft 36 is increased by the torque output from the motor MG2 to the driveshaft 36. This accordingly increases the rotation speed Ne of the engine 22. In the case where the motor MG1 fails to crank the engine 22, this increases the rotation speed. Ne of the engine 22 to a level for starting operation control of the engine 22.

Referring back to FIG. 3, the HVECU 70 subsequently compares the rotation speed Ne of the engine 22 with a threshold value Nst that is lower than the reference value Nref (step S210). The threshold value Nst is determined in advance by experiment or by analysis as a minimum rotation speed that increases the rotation speed Ne of the engine 22 to or above the reference value Nref by starting operation control of the engine 22 (fuel injection control and ignition control) or a slightly higher rotation speed than the minimum rotation speed and may be, for example, 200 rpm or 300 rpm.

When the rotation speed Ne of the engine 22 is lower than the threshold value Nst, the HVECU 70 terminates this routine. When the rotation speed Ne of the engine 22 is equal to or higher than the threshold value Nst, on the other hand, the HVECU 70 determines whether operation control of the engine 22 has already been started (step S220). When operation control of the engine 22 has not yet been started, the HVECU 70 sends an operation control start signal of the engine 22 to the engine ECU 24 (step S230) and terminates this routine. When receiving the operation control start signal of the engine 22, the engine ECU 24 starts fuel injection control and ignition control of the engine 22. This starts operation control of the engine 22. When operation control of the engine 22 has already been started at step 3220, the HVECU 70 terminates this routine. The operation control of the engine 22 is started when the rotation speed Ne of the engine 22 is increased and reaches or exceeds the threshold, value Nst by the control of the inverters 41 and 42 described above. This causes the rotation speed Ne of the engine 22 to be increased to or above the reference value Nref by the torque output from the engine 22. When the rotation speed Ne of the engine 22 increases to or above the reference value Nref, the HVECU 70 determines that the rotation speed Ne of the engine 22 is equal to or higher than the reference value Nref at step S120 and proceeds to the processing of and after step S130 or, in other words, performs the specified power generation drive. This further increases the drivable time and the drivable distance for a run with only the torque (power) output from the motor MG2 to the driveshaft 36.

According to this embodiment, when the rotation speed Ne of the engine 22 is lower than the reference value Nref and the vehicle speed V is lower than the reference value Vref1 (for example, 1 km/h, 2 km/h or 3 km/h), the vehicle speed condition is not satisfied. The hybrid vehicle 20 then shuts off the gates of the inverter 41 without performing the three phase-on control of the inverter 41, upon determination that the shift condition is not satisfied. When the three phase-on control of the inverter 41 is performed in the state that the vehicle speed V is lower than the reference value Vref1, the vehicle speed V is likely to be fluctuated between positive value and negative value across value 0 with a variation in torque applied to the driveshaft 36 or a variation of the required torque Tr* caused by the drag torque of the motor MG1. Shutting off the gates of the inverter 41 in this state suppresses such a variation in vehicle speed V across the value 0.

As described above, in the specified abnormality state where a sensor used for controlling the inverter 41 (for example, the rotational position detection sensor 43 or the current sensors 45*u* and 45*v*) has an abnormality, the hybrid vehicle 20 of the embodiment performs the three phase-on control of the inverter 41 when the rotation speed Ne of the engine 22 is lower than the reference value Nref (for example, during stop of rotation of the engine 22). The drag torque Tdr of the motor MG1 works to suppress the rotation speed Nm1 of the motor MG1 from decreasing (increasing as negative value) when the rotation speed Nr of the driveshaft 36 (i.e., vehicle speed V) is increased by the torque output from the motor MG2 to the driveshaft 36. This accordingly increases the rotation speed Ne of the engine 22. As a result, in the case where the motor MG1 fails to crank the engine 22, this increases the rotation speed Ne of the engine 22 to a level for starting operation control of the engine 22. When the rotation speed Ne of the engine 22 becomes equal to or higher than the threshold value Nst, the hybrid vehicle 20 starts operation control of the engine 22 to operate the engine 22. This causes the rotation speed Ne of the engine 22 to be increased to or above the reference value Nref by the torque output from the engine 22. When the rotation speed Ne of the engine 22 reaches or exceeds the reference value Nref, the hybrid vehicle 20 shuts off the gates of the inverter 41 and is driven with using the electric power generated accompanied by the back electromotive force of the motor MG1 to drive the motor MG2 and charge the battery 50. This further increases the drivable time and the drivable distance for a run with only the torque (power) output from the motor MG2 to the driveshaft 36.

In the event of a specified abnormality, the hybrid vehicle 20 of the embodiment does not perform the three phase-on control of the inverter 41 but shuts off the gates of the inverter 41 when the rotation speed Ne of the engine 22 is lower than the reference value Nref (for example, during stop of rotation of the engine 22) and the vehicle speed V is lower than the reference value Vref1. This suppresses the vehicle speed V from being fluctuated across the value 0.

In the event of a specified abnormality, the hybrid vehicle 20 of the embodiment does not perform the three phase-on control of the inverter 41 but shuts off the gates of the inverter 41 when the rotation speed Ne of the engine 22 is lower than the reference value Nref and the vehicle speed V is lower than the reference value Vref1. According to a modification, the hybrid vehicle may perform the three phase-on control of the inverter 41. In other words, the vehicle speed condition of the shift condition is that the vehicle speed V is between the reference value Vref1 and the reference value Vref2 inclusive according to the embodiment, but may be that the vehicle speed V is not higher than the reference value Vref2.

In the event of a specified abnormality, the hybrid vehicle 20 of the embodiment performs the three phase-on control of the inverter 41 irrespective of the rotation speed Nm1 of the motor MG1, upon satisfaction of the shift condition when the rotation speed Ne of the engine 22 is lower than the reference value Nref. According to one modification, the hybrid vehicle may interrupt the three phase-on control of the inverter 41 and shut off the gates of the inverter 41 when the rotation speed Nm1 of the motor MG1 becomes positive. This is attributed to the following reason. When the motor MG1 has positive rotation speed Nm1, the three phase-on control of the inverter 41 causes the drag torque Tdr of the motor MG1 to be provided as a torque in a direction of decreasing the rotation speed Nm1. Before start of operation control of the engine 22, when the rotation speed Nr of the driveshaft 36 (vehicle speed V) is increased by the torque output from the motor MG2 to the driveshaft 36, the drag torque Tdr of the motor MG1 is likely to decrease the rotation speed Nm1 of the motor MG1 and thereby interfere with a smooth increase of the rotation speed Ne of the engine 22. After start of operation control of the engine 22, the drag torque Tdr of the motor MG1 is provided as a torque in a direction of suppressing an increase in rotation speed Ne of the engine 22 by the torque output from, the engine 22. By taking into account this reason, the three phase-on control of the inverter 41 may be interrupted when the rotation speed Nm1 of the motor MG1 becomes positive.

In the event of a specified abnormality, the hybrid vehicle 20 of the embodiment sets the required torque Tr* to the torque command Tm2* of the motor MG2 when the rotation speed Ne of the engine 22 is equal to or higher than the reference value Nref. According to a modification, the torque command Tm2* of the motor MG2 may be set to a value obtained by subtracting a torque (−Tce/ρ) that is applied to the driveshaft 36 via the planetary gear 30 by a torque Tee caused by the back electromotive force of the motor MG1 (hereinafter referred to as back electromotive torque) from; the required torque Tr* as shown by Equation (2) given below. The back electromotive torque Tee may be read from the relationship between the rotation speed Nm1 (predetermined rotation speed Nm1set) of the motor MG1 and the back electromotive torque Tce that is determined in advance by experiment or by analysis. When the rotation speed Nm1 of the motor MG1 is computable, the back electromotive torque Tee may be calculated by dividing a consumed power (generated power) Pm1 of the motor MG1, which is given as the result of subtraction of a consumed power Pm2 of the motor MG2 from a charge-discharge power Pb of the battery 50, by the rotation speed Nm1 of the motor MG1 as shown by Equation (3) given below. The charge-discharge power Pb of the battery 50 may be calculated as the product of the battery voltage Vb of the battery 50 detected by the voltage sensor and the battery current Ib of the battery 50 detected by the current sensor. The consumed power Pm2 of the motor MG2 may be calculated as the product of a torque Tm2 (previous value of the torque command Tm2*) and the rotation speed Nm2 of the motor MG2.

$$Tm2^* = Tr^* + Tce/\rho \qquad (2)$$

$$Tce = (Pb - Pm2)/Nm1 \qquad (3)$$

In the hybrid vehicle of this aspect, in the specified abnormality state, when the rotation speed of the engine is equal to or higher than a predetermined second rotation speed that is higher than the predetermined rotation speed, the controller may shut off gates of the first inverter, control the engine to be rotated at a target rotation speed and control the second inverter such as to cause the driving torque to be output from the second motor to the driveshaft. This further increases the drivable time and the drivable distance during a run with only the power from the second motor.

Further, in the hybrid vehicle of this aspect, in the specified abnormality state during stop of operation of the engine, when vehicle speed is equal to or lower than a predetermined vehicle speed, the controller may shut off gates of the first inverter. The predetermined vehicle speed may be, for example, an upper limit of a vehicle speed range in which the rotation speed of the driveshaft is likely to be fluctuated between positive and negative across value 0 by the drag torque of the first motor caused by the three phase-on control of the first inverter. Accordingly, when the vehicle speed is equal to or lower than the predetermined vehicle speed, the hybrid vehicle stops driving the first inverter, so as to suppress the rotation speed of the driveshaft from being fluctuated across the value 0.

In the hybrid vehicle of the invention, the controller may shut off the gates of the first inverter when the rotating direction of the first motor becomes identical with the rotating direction of the engine during the three phase-on control.

The following describes the correspondence relationship between the primary components of the embodiment and the primary components of the invention described in Summary of Invention. The engine 22 of the embodiment corresponds to the "engine"; the motor MG1 corresponds to the "first motor"; the planetary gear 30 corresponds to the "planetary gear"; the motor MG2 corresponds to the "second motor"; the inverter 41 corresponds to the "first inverter"; the inverter 42 corresponds to the "second inverter" and the battery 50 corresponds to the "battery". The HVECU 70 performing the specified abnormality control routine of FIG. 3, the engine ECU 24 controlling the engine 22 in response to an instruction from the HVECU 70 and the motor ECU 40 controlling the inverters 41 and 42 in response to an instruction from the HVECU 70 correspond to the "controller".

The correspondence relationship between the primary components of the embodiment and the primary components of the invention, regarding which the problem is described in Summary of Invention, should not be considered to limit the components of the invention, regarding which the problem is described in Summary of Invention, since the embodiment is only illustrative to specifically describes the aspects of the invention, regarding which the problem is described in Summary of Invention. In other words, the invention, regarding which the problem is described in Summary of Invention, should be interpreted on the basis of the description in the Summary of Invention, and the embodiment is only a specific example of the invention, regarding which the problem is described in Summary of Invention.

The aspect of the invention is described above with reference to the embodiment. The invention is, however, not limited to the above embodiment but various modifications and variations may be made to the embodiment without departing from the scope of the invention.

The disclosure of Japanese Patent Application No. 2014-243890 filed Dec. 2, 2014 including specification, drawings and claims is incorporated herein by reference in its entirety.

INDUSTRIAL APPLICABILITY

The technique of the invention is preferably applicable to the manufacturing industries of hybrid vehicle.

The invention claimed is:

1. A hybrid vehicle, comprising
an engine;
a first motor that is configured as a three-phase AC motor to input and output power;
a planetary gear that is configured to have three rotational elements connected with a rotating shaft of the first motor, an output shaft of the engine and a driveshaft linked with drive wheels such that the rotating shaft, the output shaft and the driveshaft are arrayed in this sequence in a collinear diagram;
a second motor that is configured to input and output power from and to the driveshaft;
a first inverter that is configured to drive the first motor;
a second inverter that is configured, to drive the second motor;
a battery that is configured to transmit electric power to and from the first motor and the second motor via the first inverter and the second inverter; and
a controller that is configured, in a specified abnormality state that a sensor used for controlling the first inverter has an abnormality during stop of operation of the engine, to perform three phase-on control of the first inverter to turn on either all switching elements in an upper arm or all switching elements in a lower arm among a plurality of switching elements of the first inverter, to control the second inverter such that a driving torque is output from the second motor to the driveshaft, and to start operation control of the engine when rotation speed of the engine becomes equal to or higher than a predetermined rotation speed.

2. The hybrid vehicle according to claim 1,
wherein in the specified abnormality state, when the rotation speed of the engine is equal to or higher than a predetermined second rotation speed that is higher than the predetermined rotation speed, the controller shuts off gates of the first inverter, controls the engine to be rotated at a target rotation speed and controls the second inverter such as to cause the driving torque to be output from the second motor to the driveshaft.

3. The hybrid, vehicle according to claim 1,
wherein in the specified abnormality state during stop of operation of the engine, when vehicle speed is equal to or lower than a predetermined vehicle speed, the controller shuts off gates of the first inverter.

4. The hybrid vehicle according to claim 2,
wherein in the specified abnormality state during stop of operation of the engine, when vehicle speed is equal to or lower than a predetermined vehicle speed, the controller shuts off gates of the first inverter.

* * * * *